(12) United States Patent
Ayyalasomayajula et al.

(10) Patent No.: US 11,966,781 B2
(45) Date of Patent: Apr. 23, 2024

(54) SYSTEM AND METHOD FOR IMPLEMENTING A STANDALONE APPLICATION MODULE

(71) Applicant: JPMorgan Chase Bank, N.A., New York, NY (US)

(72) Inventors: Sudheendra Ayyalasomayajula, Coatesville, PA (US); Raghuram Vudathu, Downingtown, PA (US); David Christopher Carey, Middletown, DE (US); Rajat Tandon, Chadds Ford, PA (US); Kelly Patrick Ernst, Wilmington, DE (US); Michael Polise, Philadelphia, PA (US); Cameron Boucher, Wilmington, DE (US); Daniel Patterson, Bridgeville, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 587 days.

(21) Appl. No.: 17/196,387

(22) Filed: Mar. 9, 2021

(65) Prior Publication Data
US 2021/0311794 A1    Oct. 7, 2021

Related U.S. Application Data

(60) Provisional application No. 63/003,982, filed on Apr. 2, 2020.

(51) Int. Cl.
*G06F 9/46* (2006.01)
*G06F 9/50* (2006.01)

(52) U.S. Cl.
CPC ................ *G06F 9/5027* (2013.01)

(58) Field of Classification Search
CPC .................................... G06F 9/5027
USPC ......................................... 718/104
See application file for complete search history.

(56) References Cited

U.S. PATENT DOCUMENTS

| | | | | |
|---|---|---|---|---|
| 7,107,591 B1* | 9/2006 | Karp | ............... | G06F 9/50 718/100 |
| 9,015,324 B2* | 4/2015 | Jackson | ............... | G06Q 10/06 709/201 |
| 10,171,383 B2* | 1/2019 | Johnston | ............... | H04L 47/83 |
| 11,425,002 B1* | 8/2022 | Miocevic | ............... | G06F 9/44542 |
| 11,487,570 B1* | 11/2022 | Shpilyuck | ............... | H04L 63/101 |
| 2008/0244600 A1* | 10/2008 | Wong | ............... | G06F 9/505 718/104 |

(Continued)

*Primary Examiner* — Mehran Kamran
(74) *Attorney, Agent, or Firm* — GREENBLUM & BERNSTEIN, P.L.C.

(57) ABSTRACT

Various methods, apparatuses/systems, and media for implementing a standalone application module are disclosed. A configuration database stores information about one or more infrastructure resources. A receiver receives a request to connect to an infrastructure resource. A processor accesses the configuration database to fetch information about the infrastructure resource; accesses one or more external resource databases to fetch infrastructure resources that are required to run an application; dynamically creates the infrastructure resources accessed from the one or more external resource databases: and establishes and maintains a connection to the dynamically created infrastructure resources required by the application to function running in background in a user's system.

20 Claims, 5 Drawing Sheets

(56) References Cited

U.S. PATENT DOCUMENTS

| | | | |
|---|---|---|---|
| 2009/0210527 A1* | 8/2009 | Kawato | G06F 9/45558 718/1 |
| 2014/0006627 A1* | 1/2014 | Arwe | G06F 9/5027 709/226 |
| 2015/0074278 A1* | 3/2015 | Maes | H04L 67/10 709/226 |
| 2015/0163288 A1* | 6/2015 | Maes | H04L 67/01 709/203 |
| 2015/0180949 A1* | 6/2015 | Maes | G06F 9/5072 709/201 |
| 2015/0304175 A1* | 10/2015 | Maes | H04L 67/10 709/226 |
| 2016/0077818 A1* | 3/2016 | Nos | H04L 41/0293 717/177 |
| 2017/0220389 A1* | 8/2017 | Michael | G06F 9/5027 |
| 2018/0173570 A1* | 6/2018 | Chintalapally | G06F 9/4881 |
| 2018/0322270 A1* | 11/2018 | Bailey | H04L 63/083 |
| 2019/0028360 A1* | 1/2019 | Douglas | H04L 41/22 |
| 2019/0058776 A1* | 2/2019 | Sylvain | G06F 8/60 |
| 2020/0073921 A1* | 3/2020 | Bradley | G06F 40/103 |
| 2020/0341815 A1* | 10/2020 | Manchale Sridhar | G06F 9/5061 |
| 2021/0311794 A1* | 10/2021 | Ayyalasomayajula | G06F 9/5005 |
| 2022/0239607 A1* | 7/2022 | Jackson | H04L 47/83 |

* cited by examiner

SYSTEM AND METHOD FOR IMPLEMENTING A STANDALONE APPLICATION MODULE

CROSS-REFERENCE TO RELATED APPLICATIONS

This application claims the benefit of priority from U.S. Provisional Patent Application No. 63/003,982, filed Apr. 2, 2020, which is herein incorporated by reference in its entirety.

TECHNICAL FIELD

This disclosure generally relates to application resources, and, more particularly, to methods and apparatuses for implementing a standalone application module for dynamically creating and maintaining one or more resources required for running an application thereby automatically allowing the application to dynamically bind to infrastructure resources at runtime.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Applications typically require infrastructure resources such as databases, message queues, etc. in order to function. Typically, these infrastructure resources need to be provided at the time of application startup. Modem applications may need to access a number of infrastructure resources in order to provide useful functionality. However, conventional techniques of coupling these infrastructure resources into a main application logic may prove to complicate architecture due to growing concerns with maintaining both the technical details such as resource availability/maintenance as well as business logic.

SUMMARY

The present disclosure, through one or more of its various aspects, embodiments, and/or specific features or sub-components, provides, among other features, various systems, servers, devices, methods, media, programs, and platforms for implementing a standalone application module for dynamically creating and maintaining one or more resources required for running an application, thereby automatically allowing the application to dynamically bind to infrastructure resources at runtime and isolate the application's business logic from the technical details of accessing resources, but the disclosure is not limited thereto. The various aspects, embodiments, features, and/or sub-components may also provide optimized processes of implementing a standalone application module for dynamically creating and maintaining one or more resources required for running an application, thereby providing a dynamic platform for insulating developers from changing drivers/technologies and providing a unified mechanism of communicating with ever changing technologies, but the disclosure is not limited thereto. The various aspects, embodiments, features, and/or sub-components may also provide optimized processes of creating a standalone application that may be solely responsible for creating and maintaining the resources that an application may use and expose the resources via a representational state transfer application processing interface (REST API), thereby allowing the application to isolate its business logic from the technical details of accessing resources.

According to an aspect of the present disclosure, a method for implementing a standalone application module by utilizing one or more processors and one or more memories is disclosed. The method may include: receiving a request to connect to an infrastructure resource: accessing a configuration database to fetch information about the infrastructure resource; accessing one or more external resource databases to fetch infrastructure resources that are required to run an application; dynamically creating the infrastructure resources accessed from the one or more external resource databases; and establishing and maintaining a connection to the dynamically created infrastructure resources required by the application to function running in background in a user's system.

According to yet another aspect of the instant disclosure, the method may further include: utilizing a representational state transfer application processing interface (REST API) to dynamically create and expose infrastructure resources required by the application.

According to a further aspect of the instant disclosure, the method may further include isolating the application's business logic from technical details of accessing the dynamically created infrastructure resources.

According to an additional aspect of the instant disclosure, wherein each component may be an isolated piece of code that may perform a task within the application corresponding to the requested application.

According to yet another aspect of the instant disclosure, the external resource databases may include one or more of the following databases, but the disclosure is not limited thereto: Oracle, Cassandra, Kafka, and Message Queue (MQ).

According to yet another aspect of the instant disclosure, the method may further include storing a list of uniform resource locators (URLs) corresponding to one or more applications onto the configuration database.

According to a further aspect of the instant disclosure, the method may further include receiving a request to run the application via a selectable URL selected from the list of URLs.

According to a further aspect of the instant disclosure, the method may further include utilizing a selectable URL selected from the list of URLs to access a web resource.

According to another aspect of the instant disclosure, a system for implementing a standalone application module is disclosed. The system may include: a configuration database that stores information regarding infrastructure resources corresponding to one or more applications; a receiver that receives a request to connect to an infrastructure resource; and a processor coupled to the configuration database and the receiver via a communication network, wherein the processor may be configured to: access the configuration database to fetch information about the infrastructure resource; access one or more external resource databases to fetch infrastructure resources that are required to run an application; dynamically create the infrastructure resources accessed from the one or more external resource databases; and establish and maintain a connection to the dynamically created infrastructure resources required by the application to function running in background in a user's system.

According to yet another aspect of the instant disclosure, the processor may be further configured to utilize a representational state transfer application processing interface (REST APT) to dynamically create and expose infrastructure resources required by the application.

According to a further aspect of the instant disclosure, the processor may be further configured to isolate the application's business logic from technical details of accessing the dynamically created infrastructure resources.

According to yet another aspect of the instant disclosure, the processor may be further configured to store a list of uniform resource locators (URLs) corresponding to the one or more applications onto the configuration database.

According to a further aspect of the instant disclosure, the processor may be further configured to cause the receiver to receive a request to run the application via a selectable URL selected from the list of URLs.

According to a further aspect of the instant disclosure, the processor may be further configured to utilize a selectable URL selected from the list of URLs to access a web resource.

According to yet another aspect of the present disclosure, a non-transitory computer readable medium configured to store instructions for implementing a standalone application module is disclosed. The instructions, when executed, cause a processor to perform the following: accessing a configuration database that stores information about one or more infrastructure resources corresponding to one or more applications: receiving a request to connect to an infrastructure resource; accessing the configuration database to fetch information about the infrastructure resource; accessing one or more external resource databases to fetch infrastructure resources that are required to run the application; dynamically creating the infrastructure resources accessed from the one or more external resource databases; and establishing and maintaining a connection to the dynamically created infrastructure resources required by the application to function running in background in a user's system.

According to an additional aspect of the instant disclosure, wherein, when executed, the instructions may further cause the processor to perform the following: utilizing a representational state transfer application processing interface (REST API) to dynamically create and expose infrastructure resources required by the application.

According to a further aspect of the instant disclosure, wherein, when executed, the instructions may further cause the processor to perform the following: isolating the application's business logic from technical details of accessing the dynamically created infrastructure resources.

According to yet another aspect of the instant disclosure, wherein, when executed, the instructions may further cause the processor to perform the following: storing a list of uniform resource locators (URLs) corresponding to the one or more applications onto the configuration database.

According to a further aspect of the instant disclosure, wherein, when executed, the instructions may further cause the processor to perform the following: receiving a request to run the application via a selectable URL selected from the list of URLs.

According to a further aspect of the instant disclosure, wherein, when executed, the instructions may further cause the processor to perform the following: utilizing a selectable URL selected from the list of URLs to access a web resource.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
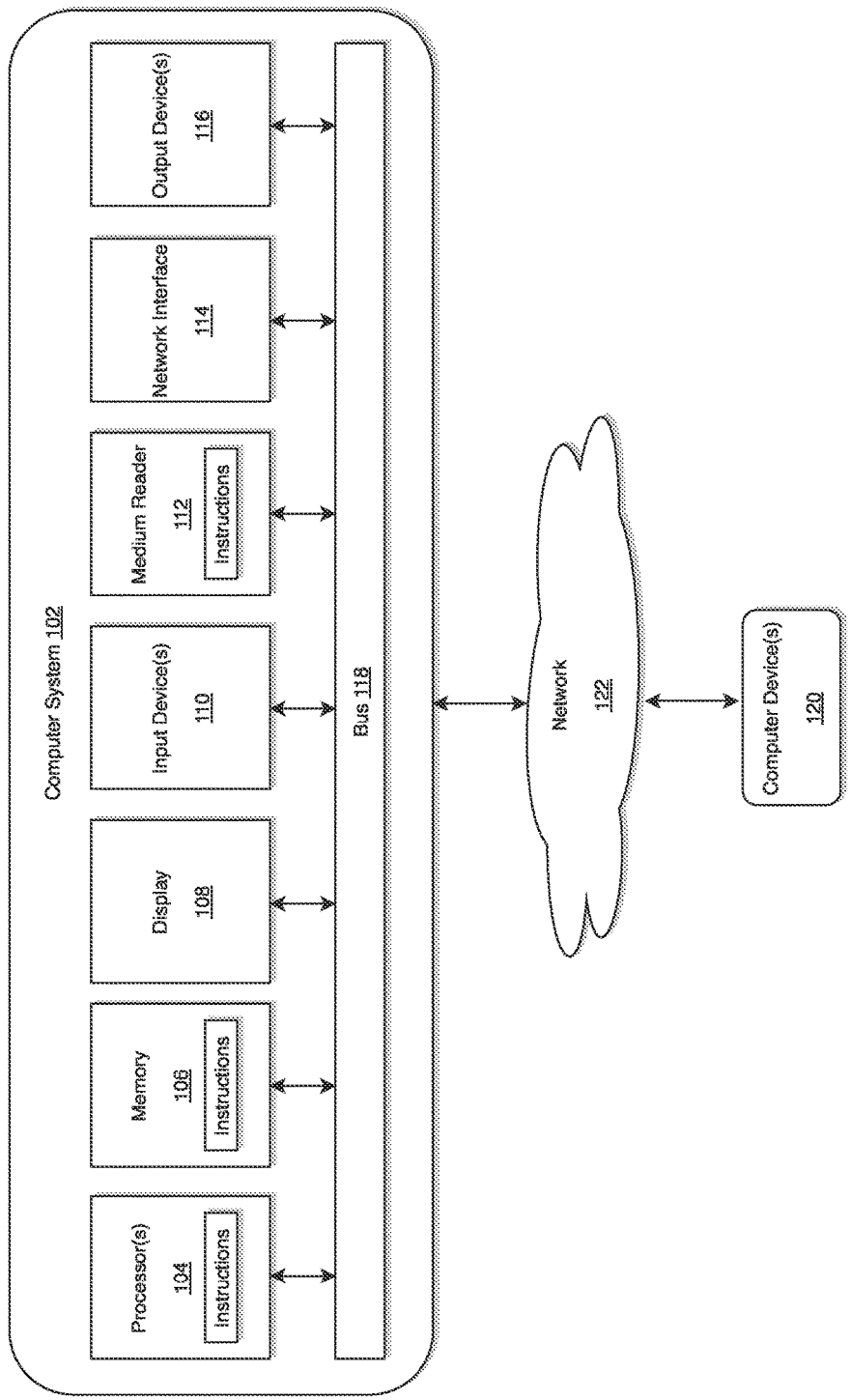
FIG. 1 illustrates a computer system for implementing a standalone application device in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (OPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
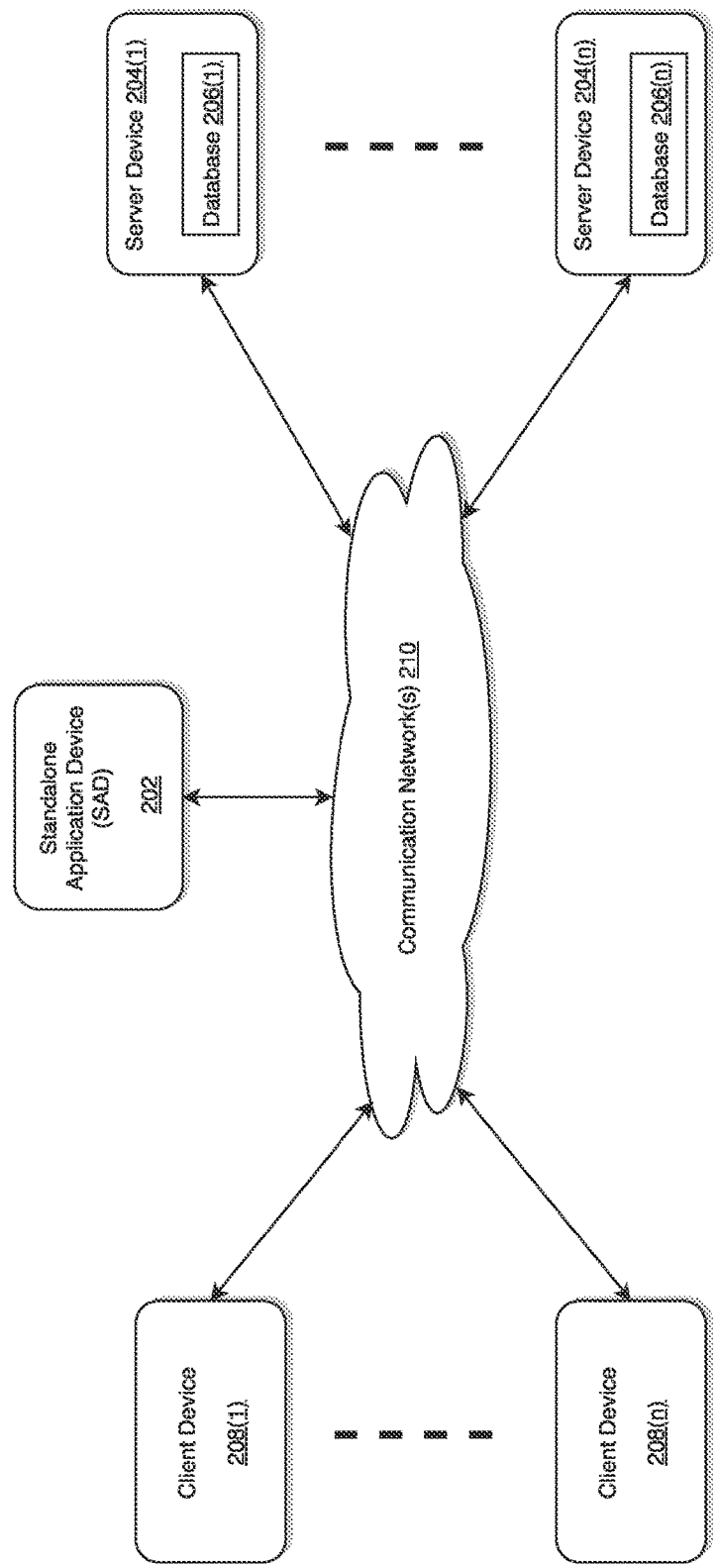
FIG. 2 illustrates an exemplary diagram of a network environment with a standalone application device in accordance with an exemplary embodiment.

Referring to FIG. 2, a schematic of an exemplary network environment 200 for implementing a standalone application device (SAD) of the instant disclosure is illustrated.

Conventional system, that does not implement an SAD of the instant disclosure, may not be able to automatically allow an application to dynamically bind to infrastructure resources at runtime.

According to exemplary embodiments, the above-described problems associated with conventional approach of testing software application may be overcome by implementing an SAD 202 as illustrated in FIG. 2 that may provide a platform for creating a standalone application that may be solely responsible for dynamically creating and maintaining one or more resources required for running an application, thereby automatically allowing the application to dynamically bind to infrastructure resources at runtime and isolate the application's business logic from the technical details of accessing resources, but the disclosure is not limited thereto. The various aspects, embodiments, features, and/or sub-components may also provide optimized processes of implementing the SAD 202 which may be configured to provide a dynamic platform for insulating developers from changing drivers/technologies and providing a unified mechanism of communicating with ever changing technologies, thereby reducing utilization of computer resources and reducing utilization of memory spaces so that sufficient numbers of memory spaces may be available for other computer processing algorithms (i.e., web browsing, streaming videos, etc.), but the disclosure is not limited thereto.

The SAD 202 may be the same or similar to the computer system 102 as described with respect to FIG. 1.

The SAD 202 may store one or more applications that can include executable instructions that, when executed by the SAD 202, cause the SAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SAD 202 itself, may be located in virtual server(s) running in a cloud-based computing environment rather than being tied to one or more specific physical network computing devices. Also, the application(s) may be running in one or more virtual machines (VMs) executing on the SAD 202. Additionally, in one or more embodiments of this technology, virtual machine(s) running on the SAD 202 may be managed or supervised by a hypervisor.

In the network environment 200 of FIG. 2, the SAD 202 is coupled to a plurality of server devices 204(1)-204(n) that hosts a plurality of databases 206(1)-206(n), and also to a plurality of client devices 208(1)-208(n) via communication network(s) 210. A communication interface of the SAD 202, such as the network interface 114 of the computer system 102 of FIG. 1, operatively couples and communicates between the SAD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SAD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SAD 202 may be a standalone device or integrated with one or more other devices or apparatuses, such as one or more of the server devices 204(1)-204(n), for example. In one particular example, the SAD 202 may be hosted by one of the server devices 204(1)-204(n), and other arrangements are also possible. Moreover, one or more of the devices of the SAD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SAD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the SAD 202 that may efficiently provide a platform for creating a standalone application that may be solely responsible for dynamically creating and maintaining one or more resources required for running an application, thereby automatically allowing the application to dynamically bind to infrastructure resources at runtime and isolate the application's business logic from the technical details of accessing resources, but the disclosure is not limited thereto.

The client devices 208(1)-208(n) may run interface applications, such as standard web browsers or standalone client applications, which may provide an interface to communicate with the SAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the SAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SAD 202, the server devices 204(1)-204(n), or the client devices 208(1)-208(n), for example, may be configured to operate as virtual instances on the same physical machine. For example, one or more of the SAD 202, the server devices 204(1)-204(n), or the client devices 208(1)-208(n) may operate on the same physical device rather than as separate devices communicating through communication network(s) 210. Additionally, there may be more or fewer SADs 202, server devices 204(1)-204(n), or client devices 208(1)-208(n) than illustrated in FIG. 2. According to exemplary embodiments, the SAD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
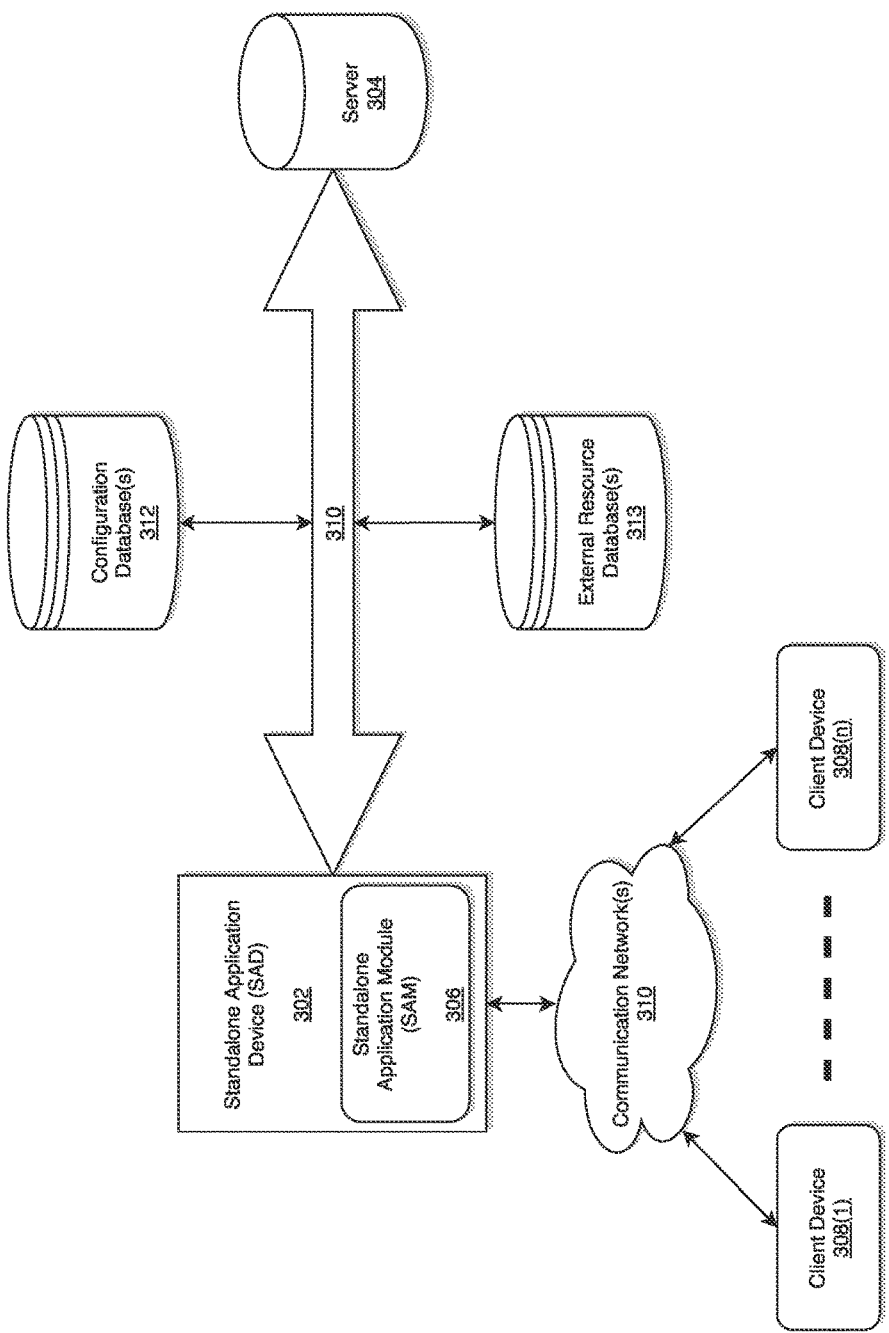
FIG. 3 illustrates a system diagram for implementing a standalone application device having a standalone application module in accordance with an exemplary embodiment.

FIG. 3 illustrates a system diagram for implementing a standalone application device (SAD) having a standalone application module (SAM) in accordance with an exemplary embodiment.

As illustrated in FIG. 3, the system 300 may include a SAD 302 within which a SAM 306 is embedded, a server 304, configuration database(s) 312, external resource database(s) 313, a plurality of client devices 308(1) ... 308(n), and a communication network 310.

According to exemplary embodiments, the SAD 302 including the SAM 306 may be connected to the server 304, the configuration database(s) 312, and the external resource database(s) 313 via the communication network 310. The SAD 302 may also be connected to the plurality of client devices 308(1) ... 308(n) via the communication network 310, but the disclosure is not limited thereto.

According to exemplary embodiment, the SAD 302 is described and shown in FIG. 3 as including the SAM 306, although it may include other rules, policies, modules, databases, or applications, for example. According to exemplary embodiments, the configuration database(s) 312 may be embedded within the SAD 302. According to exemplary embodiments, the configuration database(s) 312 may be configured to store a list of uniform resource locators (URLs) corresponding to one or more applications, but the disclosure is not limited thereto.

According to exemplary embodiments, the SAM 306 may be configured to receive real-time feed of data from the plurality of client devices 308(1) ... 308(n) via the communication network 310.

As will be described below, the SAM 306 may be configured to receive a request for running an application via a selectable URL among the list of URLs: access the configuration database(s) 312 to fetch information about the selectable URL; send details regarding the received request to a micro-service which may provide missing components to the configuration database(s) that are needed to be executed for running the application in response to the received request by accessing the configuration database(s) 312; access one or more external resource database(s) 313 to fetch resources that are required to run the application: dynamically create the resources accessed from the one or more external resource database(s) 313: and establish and maintain a connection to the dynamically created resources, required by the application to function, running in background in a user's system (e.g., one or more client devices 308(1) ... 308(n)).

According to exemplary embodiments, as will be described below, the SAM 306 may be configured to receive a request to connect to an infrastructure resource: access the configuration database(s) 312 to fetch information about the infrastructure resource; access one or more external resource database(s) 313 to fetch infrastructure resources (e.g., MQ, Kafka, Oracle, Cassandra, etc.) that may be required to run an application; dynamically create the infrastructure resources accessed from the one or more external resource database(s) 313: and establish and maintain a connection to the dynamically created infrastructure resources, required by the application to function, running in background in a user's system (e.g., one or more client devices 308(1) ... 308(n)).

The plurality of client devices 308(1) ... 308(n) are illustrated as being in communication with the SAD 302. In this regard, the plurality of client devices 308(1) ... 308(n) may be "clients" of the SAD 302 and are described herein as such. Nevertheless, it is to be known and understood that the plurality of client devices 308(1) ... 308(n) need not necessarily be "clients" of the SAD 302, or any entity described in association therewith herein. Any additional or alternative relationship may exist between either or both of the plurality of client devices 308(1) ... 308(n) and the SAD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) ... 308(n) may communicate with the SAD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The SAD 302 may be the same or similar to the SAD 202 as described with respect to FIG. 2, including any features or combination of features described with respect thereto.

Figure 4:
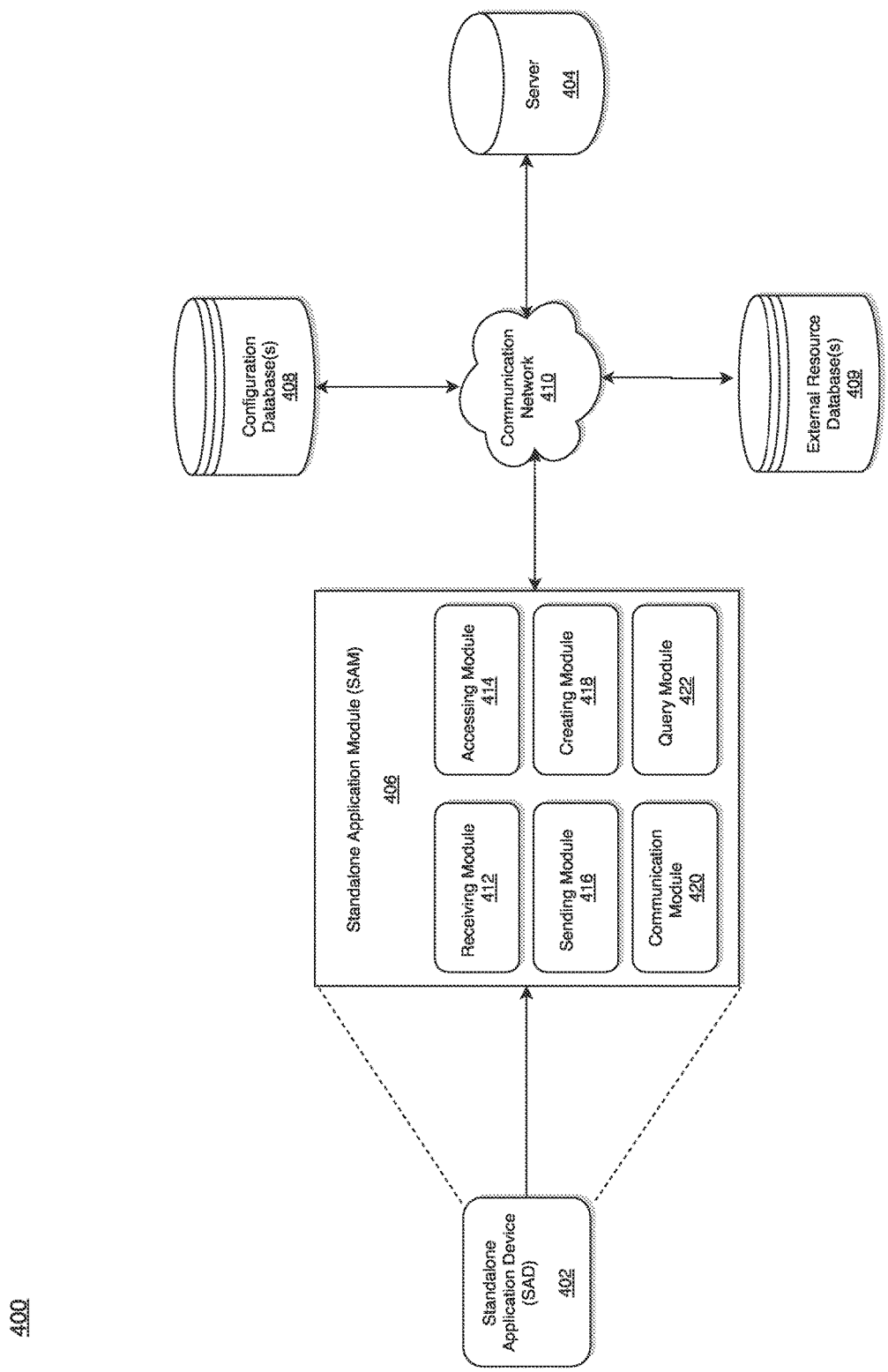
FIG. 4 illustrates a system diagram for implementing a standalone application module in accordance with an exemplary embodiment.

FIG. 4 illustrates a system diagram for implementing a SAM in accordance with an exemplary embodiment.

According to exemplary embodiments, the system 400 may include a SAD 402 within which a SAM 406 is embedded, a server 404, configuration database(s) 408, external resource database(s) 409, and a communication network 410.

According to exemplary embodiments, the SAD 402 including the SAM 406 may be connected to the server 404, the configuration database(s) 408, and the external resource database(s) 409 via the communication network 410. The SAD 402 may also be connected to the plurality of client devices (not shown) via the communication network 410, but the disclosure is not limited thereto. These client devices may be the same or similar to the client devices 308(1) ... 308(n) as illustrated in FIG. 3.

According to exemplary embodiments, as illustrated in FIG. 4, the SAM 406 may include a receiving module 412, an accessing module 414, a sending module 416, a creating module 418, a communication module 420, and a query module 422. According to exemplary embodiments, the sending module 416 may be a transmission module that may be configured to transmit data (e.g., requests, responses, etc.).

According to exemplary embodiments, each of the receiving module 412, the accessing module 414, the sending module 416, the creating module 418, the communication module 420, and the query module 422 of the SAM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the receiving module 412, the accessing module 414, the sending module 416, the creating module 418, the communication module 420, and the query module 422 of the SAM 406 may be implemented by microprocessors or similar, and may be programmed using software (e.g., microcode) to perform various functions discussed herein and may optionally be driven by firmware and/or software. Alternatively, according to exemplary embodiments, each of the receiving module 412, the accessing module 414, the sending module 416, the creating module 418, the communication module 420, and the query module 422 of the SAM 406 may be implemented by dedicated hardware, or as a combination of dedicated hardware to perform some functions and a processor (e.g., one or more programmed microprocessors and associated circuitry) to perform other functions.

According to exemplary embodiments, the configuration database(s) 408 may store information regarding one or more infrastructure resources. According to exemplary embodiments, the configuration database(s) 408 may also store a list of uniform resource locators (URLs) corresponding to one or more applications, but the disclosure is not limited thereto.

According to exemplary embodiments, the receiving module 412 may be configured to receive a request to connect to an infrastructure resource. According to exemplary embodiments, the receiving module 412 may also be configured to receive a request, via a selectable URL among the list of URLs, for running an application.

According to exemplary embodiment, the accessing module 414 may be configured to access the configuration database(s) 408 to fetch information about the infrastructure resource. According to exemplary embodiment, the accessing module 414 may also be configured to access the configuration database(s) 408 to fetch information about the selectable URL based on the received request. According to exemplary embodiments, the receiving module 412 may be configured to receive a request from a user or a calling application, but the disclosure is not limited thereto. According to exemplary embodiments, the request may contain all information required to connect to one or more resources (e.g., an infrastructure resources) for running the application. According to exemplary embodiments, the request may also contain information on where connectivity information is located (e.g., the configuration database(s) 408).

According to exemplary embodiments, the sending module 416 may be configured to send details regarding the received request to a micro-service which may provide missing components to the configuration database(s) 408 that are needed to be executed for running the application in response to the received request, received from the receiving module 412, by accessing the configuration database(s) 408. According to exemplary embodiments, each component may be an isolated piece of code which may perform a task within the application corresponding to the requested application.

According to exemplary embodiments, micro-service may be a python micro-service that may include information regarding code name, code version, and code description of each component. According to exemplary embodiments, the micro-service may be an architectural style that may structure the application as a collection of services that are highly maintainable and testable, loosely coupled, independently deployable, organized around desired business logics. According to exemplary embodiments, the SAM 406, via the implementation of the micro-service architecture, may be configured to enable the rapid, frequent and reliable delivery of large, complex applications. According to exemplary embodiments, the SAM 406, via the implementation of the micro-service architecture, may also be configured to enable an organization to evolve its technology stack.

According to exemplary embodiments, the accessing module 414 may be configured to access one or more external resource databases to fetch resources (e.g., infrastructure resources) that are required to run the application. According to exemplary embodiments, the external resource databases may include one or more of the following databases: Oracle, Cassandra, Kafka, and Message Queue (MQ), but the disclosure is not limited thereto.

According to exemplary embodiments, the python micro-service may be configured to send a query to the SAM 406, by utilizing the query module 422, so that the SAM 406 may query the external resource database(s) 409 for resources that are necessary for running the application.

According to exemplary embodiments, the creating module 418 may be configured to dynamically create the resources accessed from the one or more external resource database(s) 409, based on the query.

According to exemplary embodiments, the SAM 406 may be configured to send a response to the user's system (not shown) via the communication module 420 and establish a connection to the dynamically created resources required by the application to function and maintain the connection running in background in the user's system (not shown). The user's system may be the same or similar to the client devices client devices 308(1) . . . 308(n) as illustrated in FIG. 3.

According to exemplary embodiments, the SAM 406 may be configured to use data from the received request received by the receiving module to execute a request against the required resource(s) to run the application. The communication module 420 may be configured to return the requested data to user or the calling application.

According to exemplary embodiments, the creating module 418 of the SAM 406 may be configured to utilize a representational state transfer application processing interface (REST API) to dynamically create and expose resources required by the application.

According to exemplary embodiments, the SAM 406 may be configured to isolate the application's business logic from technical details of accessing the dynamically created resources.

Therefore, according to exemplary embodiments, the SAM 406 may be configured to provide a uniform way via REST API to connect to any infrastructure related resource, such as MQ, Kafka, Oracle, Cassandra, etc. By utilizing such a mechanism as disclosed herein to connect to infrastructure resources, the calling application may be insulated from any changes that need to be made for establishing connectivity to the infrastructure resources. The "changes" that may be required can range from upgrading software to combat known vulnerabilities, or can even go up to having to completely change languages in the event the new language provides better security/speed/etc.

According to exemplary embodiments, the SAM 406 may be configured to reutilize the components from other parts of the application or from different application without re-architecting the entire application to create the selectable URL.

According to exemplary embodiments, the SAM 406 may be configured to utilize the selectable URL to access a web resource.

According to exemplary embodiments, the SAD 402 may include a memory (e.g., a memory 106 as illustrated in FIG. 1) which may be a non-transitory computer readable medium that may be configured to store instructions for implementing an SAM 406 for dynamically creating and maintaining one or more resources required for running an application as disclosed herein. The SAD 402 may also include a medium reader (e.g., a medium reader 112 as illustrated in FIG. 1) which may be configured to read any one or more sets of instructions, e.g., software, from any of the memories described herein. The instructions, when executed by a processor embedded within the SAM 406 or within the SAD 402, may be used to perform one or more of the methods and processes as described herein. In a particular embodiment, the instructions may reside completely, or at least partially, within the memory 106, the medium reader 112, and/or the processor 104 (see FIG. 1) during execution by the SAD 402.

According to exemplary embodiments, the instructions, when executed, may cause a processor embedded within the SAM 406 or the SAD 402 to perform the following: accessing a configuration database that stores a list of uniform resource locators (URLs) corresponding to one or more applications; receiving a request, via a selectable URL among the list of URLs, for running an application; accessing the configuration database to fetch information about the selectable URL: sending details regarding the received request to a micro-service which provides missing components to the configuration database that are needed to be executed for running the application in response to the received request by accessing the configuration database; accessing one or more external resource databases to fetch resources that are required to run the application; dynamically creating the resources accessed from the one or more external resource databases; and establishing and maintaining connection to the dynamically created resources required by the application to function running in background in a user's system. The processor may be the same or similar to the processor 104 as illustrated in FIG. 1 or the processor embedded within SAD 202, SAD 302, SAD 402, and SAM 406.

According to exemplary embodiments, the instructions, when executed, may further cause the processor 104 to perform the following: utilizing a representational state transfer application processing interface (REST API) to dynamically create and expose resources required by the application.

According to exemplary embodiments, the instructions, when executed, may further cause the processor 104 to perform the following: isolating the application's business logic from technical details of accessing the dynamically created resources.

According to exemplary embodiments, the instructions, when executed, may further cause the processor 104 to perform the following: reutilizing the components from other parts of the application or from different application without re-architecting the entire application to create the selectable URL.

According to exemplary embodiments, when executed, the instructions may further cause the processor 104 to perform the following: storing a list of uniform resource locators (URLs) corresponding to the one or more applications onto the configuration database.

According to exemplary embodiments, when executed, the instructions may further cause the processor 104 to perform the following: receiving a request to run the application via a selectable URL selected from the list of URLs.

According to exemplary embodiments, when executed, the instructions may further cause the processor 104 to perform the following: utilizing a selectable URL selected from the list of URLs to access a web resource.

Figure 5:
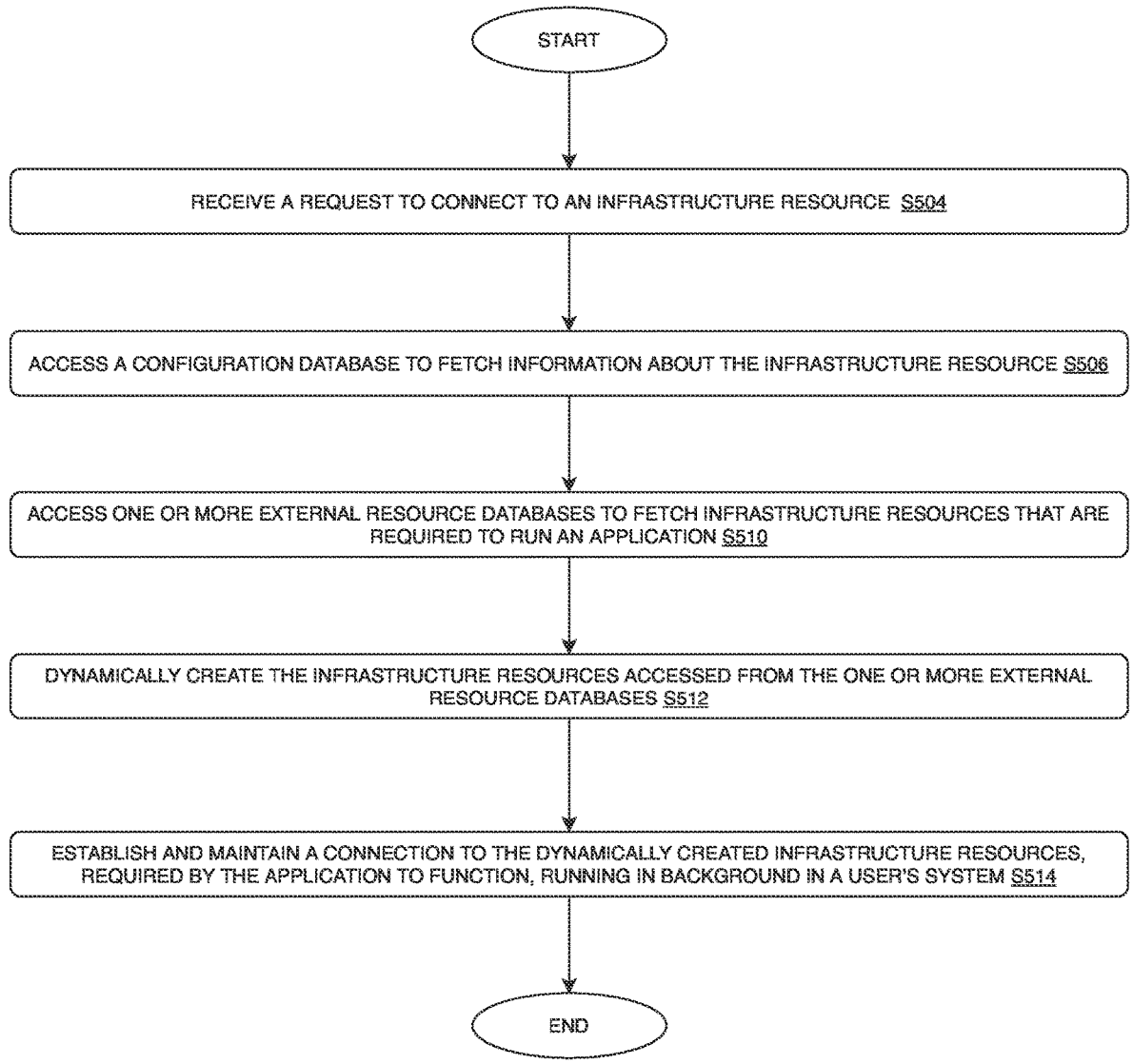
FIG. 5 illustrates a flow chart for implementing a standalone application module in accordance with an exemplary embodiment.

FIG. 5 illustrates a flow chart for implementing a standalone application module in accordance with an exemplary embodiment.

In the process 500 of FIG. 5, at step S504, request may be received to connect to an infrastructure resource.

At step S506, the configuration database may be accessed to fetch information about the infrastructure resource.

At step S510, one or more external resource databases may be accessed to fetch resources (e.g., infrastructure resources such as MQ, Kafka, Oracle, Cassandra, etc.) that are required to run the application, but the disclosure is not limited thereto.

At step S512, the infrastructure resources accessed may be dynamically created from the one or more external resource databases.

At step S514, connection to the dynamically created infrastructure resources required by the application to function may be established and maintained running in background in a user's system.

According to exemplary embodiments, the process 500 may further include: utilizing a representational state transfer application processing interface (REST API) to dynamically create and expose resources required by the application.

According to exemplary embodiments, the process 500 may further include: isolating the application's business logic from technical details of accessing the dynamically created resources.

According to exemplary embodiments, the process 500 may further include: reutilizing components from other parts of the application or from different application without re-architecting the entire application to create a selectable URL.

According to exemplary embodiments, the process 500 may further include: storing a list of uniform resource locators (URLs) corresponding to the one or more applications onto the configuration database.

According to exemplary embodiments, the process 500 may further include: receiving a request to run the application via a selectable URL selected from the list of URLs.

According to exemplary embodiments, the process 500 may further include: utilizing a selectable URL selected from the list of URLs to access a web resource According to exemplary embodiments as disclosed above in FIGS. 1-5, technical improvements effected by the instant disclosure may include a platform for implementing a standalone application module for dynamically creating and maintaining one or more resources required for running an application, thereby automatically allowing the application to dynamically bind to infrastructure resources at runtime and isolate the application's business logic from the technical details of accessing resources, but the disclosure is not limited thereto. According to exemplary embodiments as disclosed above in FIGS. 1-5, technical improvements effected by the instant disclosure may further include a platform for implementing a standalone application module for dynamically creating and maintaining one or more resources required for running an application, thereby providing a dynamic platform for insulating developers from changing drivers/technologies and providing a unified mechanism of communicating with ever changing technologies, but the disclosure is not limited thereto. According to exemplary embodiments as disclosed above in FIGS. 1-5, technical improvements effected by the instant disclosure may further include a platform for creating a standalone application that may be solely responsible for creating and maintaining the resources that an application may use and expose the resources via a representational state transfer application processing interface (REST API), thereby allowing the application to isolate its business logic from the technical details of accessing resources.

According to exemplary embodiments as disclosed above in FIGS. 1-5, technical improvements effected by the instant disclosure may include a platform for implementing a standalone application module for dynamically creating and maintaining one or more resources (e.g., infrastructure resources) required for running an application, thereby allowing computer devices operated by businesses to better allocate only the necessary resources for the operations.

Conventional approaches bundle the code to access a resource and perform the business logic in one application. However, according to exemplary embodiments as disclosed above in FIGS. 1-5, technical improvements effected by the instant disclosure may include a platform for segregating that functionality into two separate applications, thereby allowing independently scaling each application according to the necessity. Thus, the standalone application module, according to exemplary embodiments, may be configured to: establish connectivity to various infrastructure components; allow an application to utilize the standalone application module to provide business value: and depending on the nature and amount of requests and the applications, independently scale either one, or both of these instances appropriately to process the requests more precisely, thereby lowering cost of operation, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a standalone application module by utilizing one or more processors and one or more memories, the method comprising:
   implementing a standalone application module that dynamically creates and maintains one or more resources required for running an application and automatically causes the application to dynamically bind to infrastructure resources at runtime and isolates the application's business logic from technical details of accessing resources, wherein the standalone application module includes a receiving module, a sending module, an accessing module, a creating module, and a communication module;
   receiving, by the receiving module, a request to connect to an infrastructure resource;
   accessing, by the accessing module, a configuration database to fetch information about the infrastructure resource;
   sending, by the sending module, details regarding the received request to a micro-service that provides missing components to the configuration database that are needed to be executed for running an application in response to the received request;
   accessing, by the accessing module, one or more external resource databases to fetch infrastructure resources including the missing components that are required to run the application;
   dynamically creating, by the creating module, the infrastructure resources accessed from the one or more external resource databases; and
   establishing and maintaining a connection, by the communication module, to the dynamically created infrastructure resources required by the application to function running in background in a user's system.

2. The method according to claim 1, further comprising:
   utilizing a representational state transfer application processing interface (REST API) to dynamically create and expose infrastructure resources required by the application.

3. The method according to claim 1, further comprising:
   isolating the application's business logic from technical details of accessing the dynamically created infrastructure resources.

4. The method according to claim 1, wherein the external resource databases include one or more of the following databases: Oracle, Cassandra, Kafka, and Message Queue (MQ).

5. The method according to claim 1, further comprising:
   storing a list of uniform resource locators (URLs) corresponding to one or more applications onto the configuration database.

6. The method according to claim 5, further comprising:
   receiving a request to run the application via a selectable URL selected from the list of URLs.

7. The method according to claim 5, further comprising:
   utilizing a selectable URL selected from the list of URLs to access a web resource.

8. A system for implementing a standalone application module, the system comprising:
   a configuration database that stores information about on or more infrastructure resources corresponding to one or more applications;
   a receiver that receives a request to connect to an infrastructure resource; and
   a processor coupled to the configuration database and the receiver via a communication network, wherein the processor is configured to:
      implement a standalone application module that dynamically creates and maintains one or more resources required for running an application and automatically causes the application to dynamically bind to infrastructure resources at runtime and isolates the application's business logic from technical details of accessing resources, wherein the standalone application module includes a receiving module, a sending module, an accessing module, a creating module, and a communication module;
      access, by the accessing module, a configuration database to fetch information about the infrastructure resource;
      send, by the sending module, details regarding the received request to a micro-service that provides missing components to the configuration database that are needed to be executed for running an application in response to the received request;
      access, by the accessing module, one or more external resource databases to fetch infrastructure resources including the missing components that are required to run the application;
      dynamically create, by the creating module, the infrastructure resources accessed from the one or more external resource databases; and
      establish and maintain a connection, by the communication module, to the dynamically created infrastructure resources required by the application to function running in background in a user's system.

9. The system according to claim 8, wherein the processor is further configured to:
   utilize a representational state transfer application processing interface (REST API) to dynamically create and expose infrastructure resources required by the application.

10. The system according to claim 8, the processor is further configured to:
    isolate the application's business logic from technical details of accessing the dynamically created infrastructure resources.

11. The system according to claim 8, wherein the external resource databases include one or more of the following databases: Oracle, Cassandra, Kafka, and Message Queue (MQ).

12. The system according to claim 8, wherein the processor is further configured to:
    store a list of uniform resource locators (URLs) corresponding to said one or more applications onto the configuration database.

13. The system according to claim 12, wherein the processor is further configured to:
    cause the receiver to receive a request to run the application via a selectable URL selected from the list of URLs.

14. The system according to claim 8, wherein the processor is further configured to:
    utilize a selectable URL selected from the list of URLs to access a web resource.

15. A non-transitory computer readable medium configured to store instructions for implementing a standalone application module, wherein, when executed, the instructions cause a processor to perform the following:

implementing a standalone application module that dynamically creates and maintains one or more resources required for running an application and automatically causes the application to dynamically bind to infrastructure resources at runtime and isolates the application's business logic from technical details of accessing resources, wherein the standalone application module includes a receiving module, a sending module, an accessing module, a creating module, and a communication module;

receiving, by the receiving module, a request to connect to an infrastructure resource;

accessing, by the accessing module, a configuration database to fetch information about the infrastructure resource;

sending, by the sending module, details regarding the received request to a micro-service that provides missing components to the configuration database that are needed to be executed for running an application in response to the received request;

accessing, by the accessing module, one or more external resource databases to fetch infrastructure resources including the missing components that are required to run the application;

dynamically creating, by the creating module, the infrastructure resources accessed from the one or more external resource databases; and establishing and maintaining a connection, by the communication module, to the dynamically created infrastructure resources required by the application to function running in background in a user's system.

16. The non-transitory computer readable medium according to claim 15, wherein, when executed, the instructions further cause the processor to perform the following:
utilizing a representational state transfer application processing interface (REST API) to dynamically create and expose infrastructure resources required by the application.

17. The non-transitory computer readable medium according to claim 15, wherein, when executed, the instructions further cause the processor to perform the following:
isolating the application's business logic from technical details of accessing the dynamically created infrastructure resources.

18. The non-transitory computer readable medium according to claim 15, wherein the external resource databases include one or more of the following databases: Oracle, Cassandra, Kafka, and Message Queue (MQ).

19. The non-transitory computer readable medium according to claim 15, wherein, when executed, the instructions further cause the processor to perform the following:
receiving a request to run the application via a selectable uniform resource locator (URL) among a list of URLs stored onto the configuration database.

20. The non-transitory computer readable medium according to claim 15, wherein, when executed, the instructions further cause the processor to perform the following:
utilizing a selectable uniform resource locator (URL) from a list of URLs stored onto the configuration database to access a web resource.

* * * * *